(12) United States Patent
Desai et al.

(10) Patent No.: US 9,166,977 B2
(45) Date of Patent: Oct. 20, 2015

(54) SECURE TEXT-TO-SPEECH SYNTHESIS IN PORTABLE ELECTRONIC DEVICES

(75) Inventors: Simon Peter Desai, Los Gatos, CA (US); Neil Patrick Adams, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 655 days.

(21) Appl. No.: 13/335,616

(22) Filed: Dec. 22, 2011

(65) Prior Publication Data

US 2013/0166915 A1  Jun. 27, 2013

(51) Int. Cl.

| | |
|---|---|
| *G06F 21/00* | (2013.01) |
| *H04L 9/32* | (2006.01) |
| *G06F 7/04* | (2006.01) |
| *G06K 9/00* | (2006.01) |
| *H04L 29/06* | (2006.01) |
| *G06F 21/31* | (2013.01) |
| *G07C 9/00* | (2006.01) |
| *G06F 21/32* | (2013.01) |

(52) U.S. Cl.
CPC ............ *H04L 63/0861* (2013.01); *H04L 9/321* (2013.01); *H04L 9/3247* (2013.01); *H04L 9/3263* (2013.01); *G06F 21/31* (2013.01); *G06F 21/32* (2013.01); *G06K 9/00885* (2013.01); *G07C 9/00071* (2013.01); *H04L 9/3281* (2013.01); *H04L 63/08* (2013.01); *H04L 63/126* (2013.01); *H04L 2209/80* (2013.01)

(58) Field of Classification Search
CPC ..... G06F 21/32; G06F 21/31; G07C 9/00071; H04L 63/08; H04L 9/3281; G06K 9/00885

USPC .......... 713/176, 168, 186; 726/5, 26; 382/115
See application file for complete search history.

(56) References Cited

U.S. PATENT DOCUMENTS

| | | | |
|---|---|---|---|
| 7,689,421 | B2 | 3/2010 | Li et al. |
| 2004/0010559 | A1* | 1/2004 | Han ............................... 709/206 |
| 2004/0098266 | A1 | 5/2004 | Hughes et al. |
| 2006/0074665 | A1* | 4/2006 | Astrov et al. ............... 704/256.1 |
| 2006/0136727 | A1* | 6/2006 | Voss et al. ...................... 713/175 |

(Continued)

FOREIGN PATENT DOCUMENTS

| | | |
|---|---|---|
| EP | 1168297 A1 | 1/2002 |
| EP | 1703492 A1 | 9/2006 |
| EP | 2306450 A1 | 4/2011 |

OTHER PUBLICATIONS

Extended European Search Report mailed Mar. 16, 2012; in corresponding application No. 11195142.2.

(Continued)

*Primary Examiner* — Aravind Moorthy
(74) *Attorney, Agent, or Firm* — Fish & Richardson P.C.

(57) ABSTRACT

A method for secure text-to-speech conversion of text using speech or voice synthesis that prevents the originator's voice from being used or distributed inappropriately or in an unauthorized manner is described. Security controls authenticate the sender of the message, and optionally the recipient, and ensure that the message is read in the originator's voice, not the voice of another person. Such controls permit an originator's voiceprint file to be publicly accessible, but limit its use for voice synthesis to text-based content created by the sender, or sent to a trusted recipient. In this way a person can be assured that their voice cannot be used for content they did not write.

33 Claims, 5 Drawing Sheets

(56) References Cited

U.S. PATENT DOCUMENTS

| | | | |
|---|---|---|---|
| 2007/0061576 A1* | 3/2007 | Takada et al. | 713/175 |
| 2007/0174396 A1 | 7/2007 | Kumar et al. | |
| 2008/0235024 A1 | 9/2008 | Goldberg et al. | |
| 2010/0281254 A1* | 11/2010 | Carro et al. | 713/162 |
| 2011/0246197 A1* | 10/2011 | Cabezas et al. | 704/235 |
| 2013/0132718 A1* | 5/2013 | Agrawal | 713/158 |
| 2013/0166914 A1* | 6/2013 | Vandervort | 713/176 |

OTHER PUBLICATIONS

Office Action mailed Oct. 24, 2014; in Canadian patent application No. 2,799,734.

* cited by examiner

SECURE TEXT-TO-SPEECH SYNTHESIS IN PORTABLE ELECTRONIC DEVICES

FIELD OF THE INVENTION

The present disclosure relates generally to text-to-speech synthesis. More particularly, the present disclosure relates to a method and system for secure text-to-speech synthesis in portable electronic devices.

BACKGROUND OF THE INVENTION

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart phones, wireless personal digital assistants (PDAs), and laptop computers with wireless 802.11 or Bluetooth capabilities.

Text-to-speech synthesis can be used in a number of applications to convert normal language text into speech, and can be implemented in software or hardware. For example, those who are visually impaired may use text-to-speech systems to read textual material. The use of text-to-speech synthesis can be useful in portable electronic devices, such as for the reading of email and text messages.

Improvements in devices using text-to-speech synthesis are desirable.

BRIEF DESCRIPTION OF THE DRAWINGS

Embodiments of the present invention will now be described, by way of example only, with reference to the attached Figures, wherein.

DETAILED DESCRIPTION

The embodiments described herein generally relate to mobile wireless communication devices, hereafter referred to as a portable electronic devices. Examples of applicable communication devices include pagers, cellular phones, cellular smartphones, wireless organizers, personal digital assistants, computers, laptops, tablets, media players, e-book readers, handheld wireless communication devices, wirelessly enabled notebook computers and the like. It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. Also, the description is not to be considered as limiting the scope of the embodiments described herein.

Embodiments of the invention may be represented as a software, or computer program, product stored in a machine-readable medium (also referred to as a computer-readable medium, a processor-readable medium, or a computer-usable medium having a computer-readable program code embodied therein or stored thereon). The machine-readable medium may be any suitable tangible, non-transitory, medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor, or processors, to perform steps in a method according to an embodiment of the invention. Those of ordinary skill in the art will appreciate that other instructions and operations necessary to implement the described invention may also be stored on the machine-readable medium. Software running from the machine readable medium may interface with circuitry or other hardware to perform the described tasks.

A portable electronic device may be a two-way communication device with advanced data communication capabilities, including the capability to communicate with other portable electronic devices or computer systems through a network of transceiver stations. The portable electronic device may also have the capability to allow voice communication. Depending on the functionality provided by the portable electronic device, it may be referred to as a pager, cellular phone, cellular smartphone, wireless organizer, personal digital assistant, computer, laptop, tablet, media player, e-book reader, handheld wireless communication device, wirelessly-enabled notebook computer and the like. To aid the reader in understanding the structure of the portable electronic device and how it communicates with other devices and host systems, reference will now be made to FIGS. 1 through 4.

Figure 1:
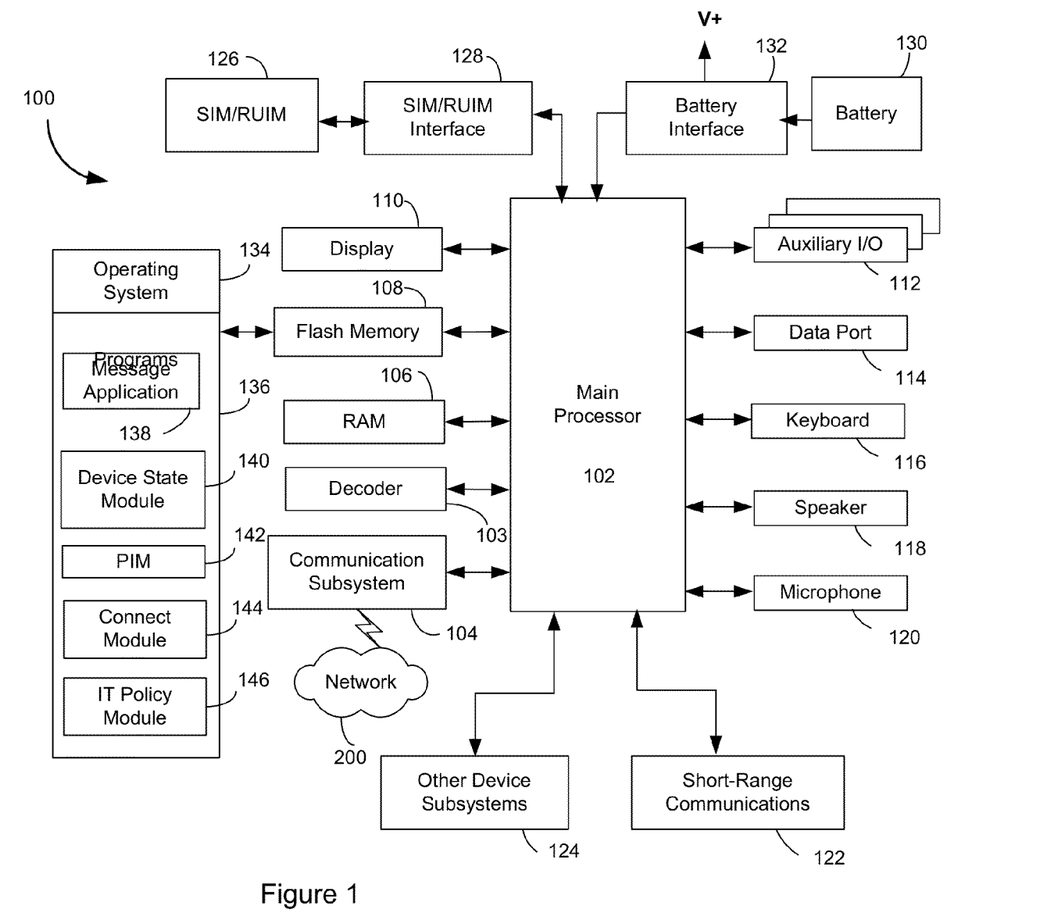
FIG. 1 is a block diagram of a portable electronic device in accordance with the disclosure.

Referring first to FIG. 1, shown therein is a block diagram of a portable electronic device 100. The portable electronic device 100 includes a number of components such as a main processor 102 that controls the overall operation of the portable electronic device 100. Communication functions, including data and voice communications, are performed through a communication subsystem 104. Data received by the portable electronic device 100 can be optionally decompressed and decrypted by decoder 103, operating according to any suitable decompression techniques (e.g. using decompression techniques for MPEG, JPEG, ZIP compression techniques) and decryption techniques (e.g. using decryption techniques for Data Encryption Standard (DES), Triple DES, or Advanced Encryption Standard (AES) encryption techniques). The communication subsystem 104 receives messages from and sends messages to a wireless network 200. In this example embodiment of the portable electronic device 100, the communication subsystem 104 can be configured in accordance with the Global System for Mobile Communication (GSM) and General Packet Radio Services (GPRS) standards, Enhanced Data GSM Environment (EDGE), Universal Mobile Telecommunications Service (UMTS), or the like. New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with portable electronic device 100 is a GSM/GPRS wireless network in one example implementation, other wireless networks may also be associated with the portable electronic device 100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks, and third-generation (3G) and fourth-generation (4G) networks, such as EDGE, UMTS, High-Speed Downlink Packet Access (HSDPA), Worldwide Interoperability for Microwave Access (WiMAX), Long Term Evolution (LTE), and LTE Advanced. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems. The main processor 102 can also interact with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122 and other device subsystems 124.

Some of the subsystems of the portable electronic device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The portable electronic device 100 can send and receive communication signals over the wireless network 200 after required network registration or activation procedures have been completed. Network access is associated with a subscriber or user of the portable electronic device 100. To identify a subscriber, the portable electronic device 100 can, for example, use a SIM/RUIM card 126 (i.e. Subscriber Identity Module or a Removable User Identity Module) inserted into a SIM/RUIM interface 128 in order to communicate with a network. A SIM is typically a component of a SIM card that can be inserted into a mobile device in order to associate that device with the user identified by the SIM. SIM cards can have various form factors such as a full size that is approximately the size of a credit card, a smaller mini size, and a still smaller micro size. Other cards, such as the Universal Integrated Circuit Card (UICC), the Universal Subscriber Identity Module (USIM) card, or the Removable User Identity Module (R-UIM) card, may function in a similar manner. Alternatively, a SIM could be stored on an embedded UICC (eUICC) or a similar software-based SIM module. Any such card or software module will be referred to herein as a SIM card, but it should be understood that such entities do not necessarily have the form factor of a card. Without the SIM card 126, the portable electronic device 100 is not fully operational for communication with the wireless network 200. By inserting the SIM card/RUIM 126 into the SIM/RUIM interface 128, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 can include some user parameters such as an International Mobile Subscriber Identity (IMSI). An advantage of using the SIM card/RUIM 126 is that a subscriber is not necessarily bound by any single physical portable electronic device. The SIM card/RUIM 126 may store additional subscriber information for a portable electronic device as well, including datebook (or calendar) information and recent call information. Alternatively, user identification information can also be programmed into the flash memory 108.

The portable electronic device 100 is a battery-powered device and includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the portable electronic device 100. Although current technology makes use of a battery, future technologies such as micro fuel cells may provide the power to the portable electronic device 100.

The portable electronic device 100 also includes an operating system 134 and software components 136, which are described in more detail below. The operating system 134 and the software components 136 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, will normally be installed on the portable electronic device 100 during its manufacture. Other software applications include a message application 138 that can be any suitable software program that allows a user of the portable electronic device 100 to send and receive electronic messages. Various alternatives exist for the message application 138 as is well known to those skilled in the art. Messages that have been sent or received by the user are typically stored in the flash memory 108 of the portable electronic device 100 or some other suitable storage element in the portable electronic device 100. In at least some embodiments, some of the sent and received messages may be stored remotely from the device 100 such as in a data store of an associated host system with which the portable electronic device 100 communicates.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the portable electronic device 100 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 200. PIM data items may be seamlessly integrated, synchronized, and updated via the wireless network 200 with the portable electronic device subscriber's corresponding data items stored and/or associated with a host computer system. This functionality creates a mirrored host computer on the portable electronic device 100 with respect to such items. This can be particularly advantageous when the host computer system is the portable electronic device subscriber's office computer system.

The portable electronic device 100 also includes a connect module 144, and an information technology (IT) policy module 146. The connect module 144 implements the communication protocols that are required for the portable electronic device 100 to communicate with the wireless infrastructure and any host system, such as an enterprise system, with which the portable electronic device 100 is authorized to interface. Examples of a wireless infrastructure and an enterprise system are given in FIGS. 3 and 4, which are described in more detail below.

The connect module 144 includes a set of APIs that can be integrated with the portable electronic device 100 to allow the portable electronic device 100 to use any number of services associated with the enterprise system. The connect module 144 allows the portable electronic device 100 to establish an end-to-end secure, authenticated communication pipe with the host system. A subset of applications for which access is provided by the connect module 144 can be used to pass IT policy commands from the host system to the portable electronic device 100. This can be done in a wireless or wired manner. These instructions can then be passed to the IT policy module 146 to modify the configuration of the device 100. Alternatively, in some cases, the IT policy update can also be done over a wired connection.

Other types of software applications can also be installed on the portable electronic device 100. These software applications can be third party applications, which are added after the manufacture of the portable electronic device 100. Examples of third party applications include games, calculators, utilities, etc.

The additional applications can be loaded onto the portable electronic device 100 through at least one of the wireless network 200, the auxiliary I/O subsystem 112, the data port 114, the short-range communications subsystem 122, or any other suitable device subsystem 124. This flexibility in application installation increases the functionality of the portable electronic device 100 and may provide enhanced on-device functions, communication-related functions, or both. For example, secure communication applications may enable electronic commerce functions and other such financial transactions to be performed using the portable electronic device 100.

The data port 114 enables a subscriber to set preferences through an external device or software application and extends the capabilities of the portable electronic device 100 by providing for information or software downloads to the portable electronic device 100 other than through a wireless communication network. The alternate download path may, for example, be used to load an encryption key onto the portable electronic device 100 through a direct and thus reliable and trusted connection to provide secure device communication. The data port 114 can be any suitable port that enables data communication between the portable electronic device 100 and another computing device. The data port 114 can be a serial or a parallel port. In some instances, the data port 114 can be a USB port that includes data lines for data transfer and a supply line that can provide a charging current to charge the battery 130 of the portable electronic device 100.

The short-range communications subsystem 122 provides for communication between the portable electronic device 100 and different systems or devices, without the use of the wireless network 200. For example, the subsystem 122 may include an infrared device and associated circuits and components for short-range communication. Examples of short-range communication standards include standards developed by the Infrared Data Association (IrDA), Bluetooth™, Near Field Communication (NFC) standards, and the 802.11 family of standards developed by IEEE.

In use, a received signal such as a text message, an e-mail message, or web page download will be processed by the communication subsystem 104 and input to the main processor 102. The main processor 102, in conjunction with the decoder 103, will then process the received signal for output to the display 110 or alternatively to the auxiliary I/O subsystem 112. A subscriber may also compose data items, such as e-mail messages, for example, using the keyboard 116 in conjunction with the display 110 and possibly the auxiliary I/O subsystem 112. The auxiliary subsystem 112 may include devices such as: a touch screen, mouse, track ball, trackpad, optical joystick, infrared fingerprint detector, or a roller wheel with dynamic button pressing capability. The keyboard 116 can include an alphanumeric keyboard and/or telephone-type keypad. However, other types of keyboards, including a virtual keyboard or an external keyboard, may also be used. A composed item may be transmitted over the wireless network 200 through the communication subsystem 104.

For voice communications, the overall operation of the portable electronic device 100 may be substantially similar, except that the received signals are output to the speaker 118, and signals for transmission are generated by the microphone 120. Alternative voice or audio I/O subsystems, such as a voice message recording subsystem, can also be implemented on the portable electronic device 100. Although voice or audio signal output is accomplished primarily through the speaker 118, the display 110 can also be used to provide additional information such as the identity of a calling party, duration of a voice call, or other voice call related information.

Figure 2:
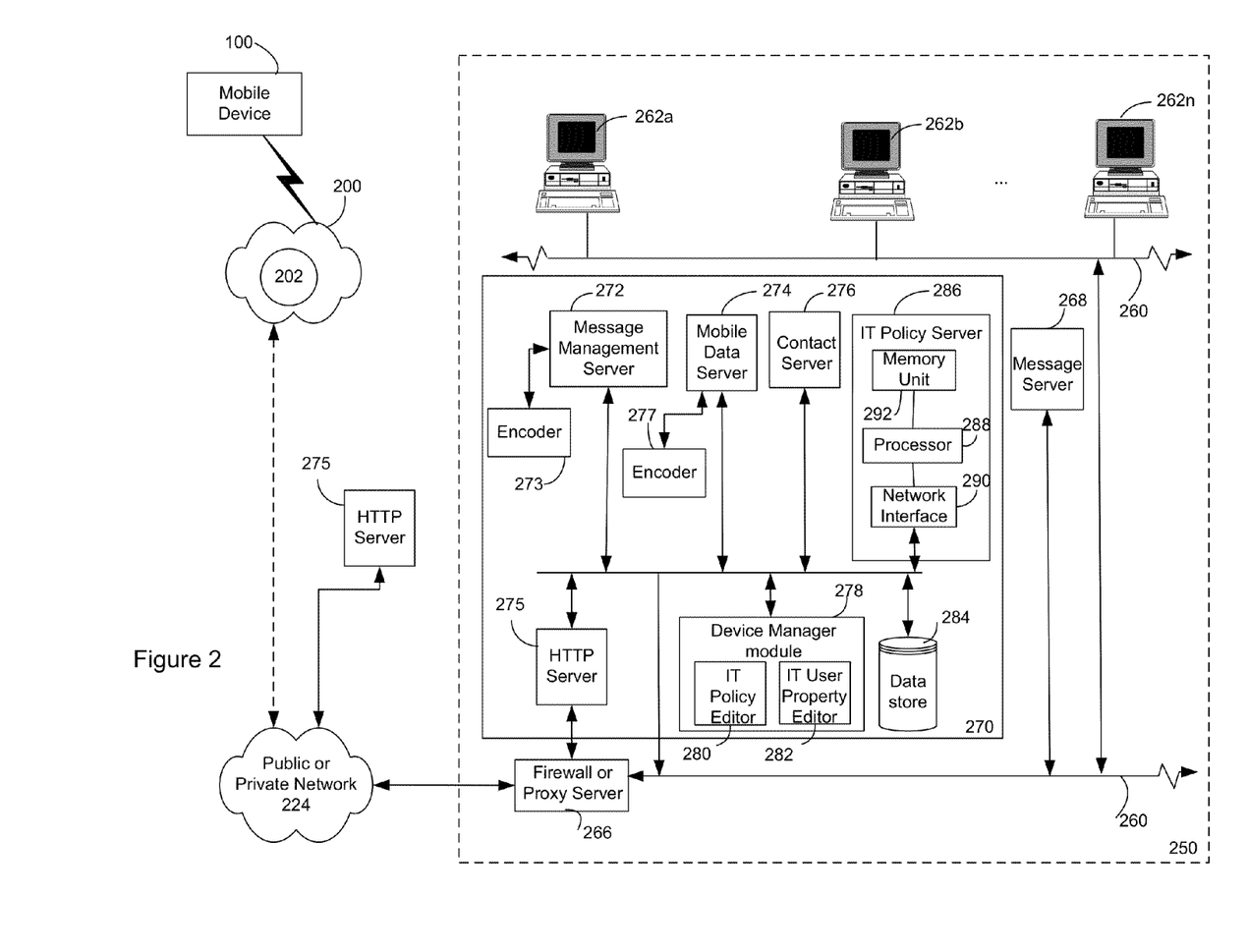
FIG. 2 is a block diagram of a host system of an example configuration in accordance with the disclosure.

FIG. 2 is a block diagram illustrating components of a configuration of a host system 250 with which the portable electronic device 100 can, in conjunction with the connect module 144, communicate. The host system 250 will typically be a corporate enterprise or other local area network (LAN), but may also be a home office computer or some other private system, for example, in variant implementations. In this example shown in FIG. 4, the host system 250 is depicted as a LAN of an organization to which a user of the portable electronic device 100 belongs. Typically, a plurality of portable electronic devices can communicate wirelessly with the host system 250 through one or more nodes 202 of the wireless network 200.

The host system 250 includes a number of network components connected to each other by a network 260. For instance, a user's desktop computer 262a is situated on a LAN connection. The portable electronic device 100 can be directly coupled to the computer 262a by a serial or a Universal Serial Bus (USB) connection, for example, or can be wirelessly connected, such as through a Bluetooth connection. The connection of the portable electronic device 100 to the computer facilitates the loading of information (e.g. PIM data, private symmetric encryption keys to facilitate secure communications) from the user computer 262a to the portable electronic device 100, and may be particularly useful for bulk information updates often performed in initializing the portable electronic device 100 for use. The information downloaded to the portable electronic device 100 may include digital certificates used in the exchange of messages.

Figure 4:
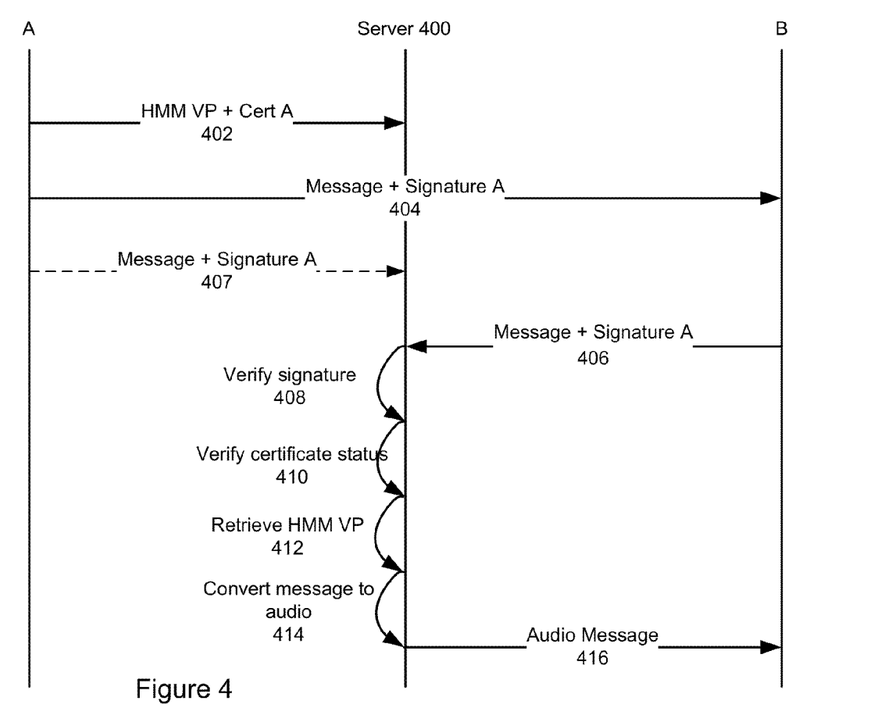
FIG. 4 is diagram of an example method of server-side authentication in accordance with the disclosure.

The user computers 262a-262n will typically also be connected to other peripheral devices, such as printers, etc. which are not explicitly shown in FIG. 4. Furthermore, only a subset of network components of the host system 250 are shown in FIG. 4 for ease of exposition, and it will be understood that the host system 250 will include additional components that are not explicitly shown in FIG. 4 for this example configuration. More generally, the host system 250 may represent a smaller part of a larger network (not shown) of the organization, and may include different components and/or be arranged in different topologies than that shown in the example embodiment of FIG. 4.

To facilitate the operation of the portable electronic device 100 and the wireless communication of messages and message-related data between the portable electronic device 100 and components of the host system 250, a number of wireless communication support components 270 can be provided. In some implementations, the wireless communication support components 270 can include a message management server 272, a mobile data server (MDS) 274, a web server, such as Hypertext Transfer Protocol (HTTP) server 275, a contact server 276, and a device manager module 278. HTTP servers can also be located outside the enterprise system, as indicated by the HTTP server 275 attached to the network 224. The device manager module 278 includes an IT Policy editor 280 and an IT user property editor 282, as well as other software components for allowing an IT administrator to configure the portable electronic devices 100. In an alternative embodiment, there may be one editor that provides the functionality of both the IT policy editor 280 and the IT user property editor 282. The support components 270 also include a data store 284, and an IT policy server 286. The IT policy server 286 includes a processor 288, a network interface 290 and a memory unit 292. The processor 288 controls the operation of the IT policy server 286 and executes functions related to the standardized IT policy as described below. The network interface 290 allows the IT policy server 286 to communicate with the various components of the host system 250 and the portable electronic devices 100. The memory unit 292 can store functions used in implementing the IT policy as well as related data. Those skilled in the art know how to implement these various components. Other components may also be included as is well known to those skilled in the art. Further, in some implementations, the data store 284 can be part of any one of the servers.

In this example embodiment, the portable electronic device 100 communicates with the host system 250 through node 202 of the wireless network 200 and a shared network infrastructure 224 such as a service provider network or the public Internet. Access to the host system 250 may be provided through one or more routers (not shown), and computing devices of the host system 250 may operate from behind a firewall or proxy server 266. The proxy server 266 provides a secure node and a wireless internet gateway for the host system 250. The proxy server 266 intelligently routes data to the correct destination server within the host system 250.

In some implementations, the host system 250 can include a wireless VPN router (not shown) to facilitate data exchange between the host system 250 and the portable electronic device 100. The wireless VPN router allows a VPN connection to be established directly through a specific wireless network to the portable electronic device 100. The wireless VPN router can be used with the Internet Protocol (IP) Version 6 (IPV6) and IP-based wireless networks. This protocol can provide enough IP addresses so that each portable electronic device has a dedicated IP address, making it possible to push information to a portable electronic device at any time. An advantage of using a wireless VPN router is that it can be an off-the-shelf VPN component, and does not require a separate wireless gateway and separate wireless infrastructure. A VPN connection can be a Transmission Control Protocol (TCP)/IP or User Datagram Protocol (UDP)/IP connection for delivering the messages directly to the portable electronic device 100 in this alternative implementation.

Messages intended for a user of the portable electronic device 100 are initially received by a message server 268 of the host system 250. Such messages may originate from any number of sources. For instance, a message may have been sent by a sender from the computer 262b within the host system 250, from a different portable electronic device (not shown) connected to the wireless network 200 or a different wireless network, or from a different computing device, or other device capable of sending messages, via the shared network infrastructure 224, possibly through an application service provider (ASP) or Internet service provider (ISP), for example.

The message server 268 typically acts as the primary interface for the exchange of messages, particularly e-mail messages, within the organization and over the shared network infrastructure 224. Each user in the organization that has been set up to send and receive messages is typically associated with a user account managed by the message server 268. Some example implementations of the message server 268 include a Microsoft Exchange™ server, a Lotus Domino™ server, a Novell Groupwise™ server, or another suitable mail server installed in a corporate environment. In some implementations, the host system 250 may include multiple message servers 268. The message server 268 may also be adapted to provide additional functions beyond message management, including the management of data associated with calendars and task lists, for example.

When messages are received by the message server 268, they are typically stored in a data store associated with the message server 268. In at least some embodiments, the data store may be a separate hardware unit, such as data store 284, with which the message server 268 communicates. Messages can be subsequently retrieved and delivered to users by accessing the message server 268. For instance, an e-mail client application operating on a user's computer 262a may request the e-mail messages associated with that user's account stored on the data store associated with the message server 268. These messages are then retrieved from the data store and stored locally on the computer 262a. The data store associated with the message server 268 can store copies of each message that is locally stored on the portable electronic device 100. Alternatively, the data store associated with the message server 268 can store all of the messages for the user of the portable electronic device 100 and only a smaller number of messages can be stored on the portable electronic device 100 to conserve memory. For instance, the most recent messages (i.e. those received in the past two to three months for example) can be stored on the portable electronic device 100.

When operating the portable electronic device 100, the user may wish to have e-mail messages retrieved for delivery to the portable electronic device 100. The message application 138 (see FIG. 1) operating on the portable electronic device 100 may also request messages associated with the user's account from the message server 268. The message application 138 may be configured (either by the user or by an administrator, possibly in accordance with an organization's IT policy) to make this request at the direction of the user, at some pre-defined time interval, or upon the occurrence of some pre-defined event. In some implementations, the portable electronic device 100 is assigned its own e-mail address, and messages addressed specifically to the portable electronic device 100 are automatically redirected to the portable electronic device 100 as they are received by the message server 268.

The message management server 272 can be used to specifically provide support for the management of messages, such as e-mail messages, that are to be handled by portable electronic devices. Generally, while messages are still stored on the message server 268, the message management server 272 can be used to control when, if, and how messages are sent to the portable electronic device 100. The message management server 272 also facilitates the handling of messages composed on the portable electronic device 100, which are sent to the message server 268 for subsequent delivery.

For example, the message management server 272 may monitor the user's "mailbox" (e.g. the message store associated with the user's account on the message server 268) for new e-mail messages, and apply user-definable filters to new messages to determine if and how the messages are relayed to the user's portable electronic device 100. The message management server 272 may also, through an encoder 273, compress messages, using any suitable compression technology (e.g. using a compression technique such as ZIP, MPEG, JPEG and other known techniques) and encrypt messages (e.g. using an encryption technique such as Data Encryption Standard (DES), Triple DES, or Advanced Encryption Standard (AES)), and push them to the portable electronic device 100 via the shared network infrastructure 224 and the wireless network 200. The message management server 272 may also receive messages composed on the portable electronic device 100 (e.g. encrypted using Triple DES), decrypt and decompress the composed messages, re-format the composed messages if desired so that they will appear to have originated from the user's computer 262a, and re-route the composed messages to the message server 268 for delivery.

Certain properties or restrictions associated with messages that are to be sent from and/or received by the portable electronic device 100 can be defined (e.g. by an administrator in accordance with IT policy) and enforced by the message management server 272. These may include whether the portable electronic device 100 may receive encrypted and/or signed messages, minimum encryption key sizes, whether outgoing messages must be encrypted and/or signed, and whether copies of all secure messages sent from the portable electronic device 100 are to be sent to a pre-defined copy address, for example.

The message management server 272 may also be adapted to provide other control functions, such as only pushing certain message information or pre-defined portions (e.g. "blocks") of a message stored on the message server 268 to the portable electronic device 100. For example, in some cases, when a message is initially retrieved by the portable electronic device 100 from the message server 268, the message management server 272 may push only the first part of a message to the portable electronic device 100, with the part being of a pre-defined size (e.g. 2 KB). The user can then request that more of the message be delivered in similar-sized blocks by the message management server 272 to the portable electronic device 100, possibly up to a maximum pre-defined message size. Accordingly, the message management server 272 facilitates better control over the type of data and the amount of data that is communicated to the portable electronic device 100, and can help to minimize potential waste of bandwidth or other resources.

The MDS 274 encompasses any other server that stores information that is relevant to the corporation. The mobile data server 274 may include, but is not limited to, databases, online data document repositories, customer relationship management (CRM) systems, or enterprise resource planning (ERP) applications. The MDS 274 can also connect to the Internet or other public network, through HTTP server 275 or other suitable web server such as an File Transfer Protocol (FTP) server, to retrieve HTTP webpages and other data. Requests for webpages are typically routed through MDS 274 and then to HTTP server 275, through suitable firewalls and other protective mechanisms. The web server then retrieves the webpage over the Internet, and returns it to MDS 274. As described above in relation to message management server 272, MDS 274 is typically provided, or associated, with an encoder 277 that permits retrieved data, such as retrieved webpages, to be compressed, using any suitable compression technology, and encrypted, using an suitable encryption technique, as described above, and then pushed to the portable electronic device 100 via the shared network infrastructure 224 and the wireless network 200.

The contact server 276 can provide information for a list of contacts for the user in a similar fashion as the address book on the portable electronic device 100. Accordingly, for a given contact, the contact server 276 can include the name, phone number, work address and e-mail address of the contact, among other information. The contact server 276 can also provide a global address list that contains the contact information for all of the contacts associated with the host system 250.

It will be understood by persons skilled in the art that the message management server 272, the MDS 274, the HTTP server 275, the contact server 276, the device manager module 278, the data store 284 and the IT policy server 286 do not need to be implemented on separate physical servers within the host system 250. For example, some or all of the functions associated with the message management server 272 may be integrated with the message server 268, or some other server in the host system 250. Alternatively, the host system 250 may include multiple message management servers 272, particularly in variant implementations where a large number of portable electronic devices need to be supported.

The present disclosure describes a method for secure text-to-speech conversion of text using speech or voice synthesis. Voice synthesis of text-based content can be used to synthesize any text-based content to an audio format for output to a recipient. For example, in a car environment it is may be undesirable for a driver to read an email or text message, and the use of text-to-speech synthesis can be used. However, the voice used in various text-to-speech systems is either a machine-generated voice, or a voice provided by a voice actor, not the sender, both of which can sound unnatural. Therefore, it is desirable to provide text-to-speech synthesis that permits messages to be read in a natural manner, for example in the voice of the sender, or another voice that is familiar to the recipient. However, to prevent the originator's voice from being used or distributed inappropriately or in an unauthorized manner, appropriate security and access controls need to be provided. For example, when voice synthesis is used to read an email message, it is desirable to have appropriate controls to ensure that the message is read in the originator's voice, not the voice of another person. Such controls permit an originator's voiceprint file to be publicly accessible, but limit its use for voice synthesis to text-based content created by the originator, or sent to a trusted recipient. In this way a person can be assured that their voice cannot be used for content they did not write.

Figure 3:
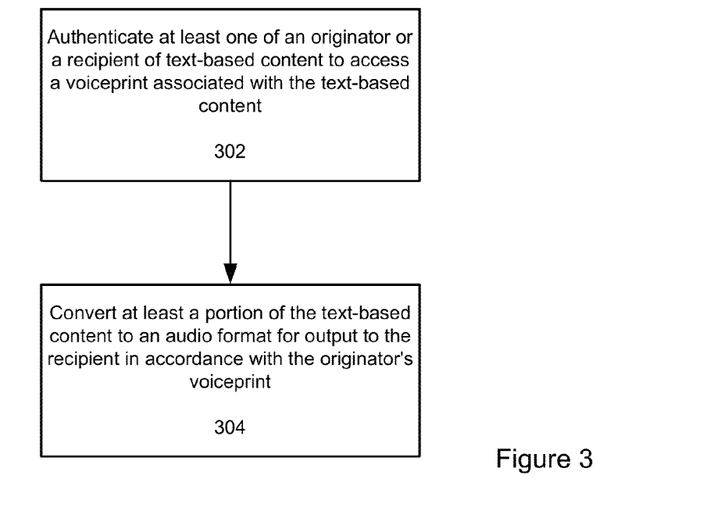
FIG. 3 is a flowchart of a method in accordance with the disclosure.

Referring to FIG. 3, the method generally consists of authenticating at least one of an originator or a recipient of text-based content to access a voiceprint associated with the text-based content (302), and converting at least a portion of the text-based content to an audio format for output to the recipient in accordance with the originator's voiceprint (304). As used herein, "text-based content" encompasses any digital text content that can be synthesized for audio read out to the recipient. Examples of text-based content includes, but is not limited to, email messages, text messages, attachments to messages, calendar appointments, tasks, and text portions of any thereof. The "originator" of the text-based content is the creator of the digital content, who, in many of the described embodiments, is the sender of a message, such as the sender of an email message. However, there are embodiments where the text-based content originates from another source, such as the creator of an attachment who is different from the sender of the message, or the creator of a calendar appointment or task, who may be, for example, the user of a portable electronic device (recipient) him or herself.

The present disclosure is not limited to a particular method of voice synthesis, and any known or later developed voice synthesis method can be used. As an example, voice synthesis based on hidden Markov models (HMM) is one method that can be used. HMM (also called Statistical Parametric Synthesis) models the frequency spectrum (vocal tract), fundamental frequency (vocal source), and duration (prosody) of a person's speech to generate hidden Markov models (sequence model and observation model), which are collectively termed herein a "voiceprint" of a speaker, sender or originator. The voiceprint can be stored as a voiceprint file. Speech waveforms can then be generated from the voiceprint. Advantages of HMM-based voice synthesis include the relatively short training time (e.g. <approximately 2 hours) needed to generate a voiceprint, and small size (e.g. typically less than approximately 5 MB) of the resulting voiceprint file. The small size of the voiceprint files reduces the bandwidth needed to transmit such files, and the memory needed to store them. In contrast, other natural voice synthesis techniques can require many hours of training, and generate voiceprint files of 11 MB to 1 GB in size. A voiceprint can also, for example, be an adaptive voiceprint that adapts a "common" voice to a specific speaker.

Referring to FIGS. 1 and 2, the method can be accomplished at a server, such as the message management server 272 (see FIG. 2), or on a portable electronic device, or on a combination thereof. For example, a server to provide secure text-to-speech conversion of text-based content can include a processor capable of authenticating at least one of an originator or a recipient of the text-based content, accessing a voiceprint associated with the originator of the text-based content; and converting, in accordance with the voiceprint, at least a portion of the text-based content to an audio format for output to the recipient or listener. A portable electronic device to provide secure text-to-speech conversion of text-based content according to the present disclosure can include a processor, such as main processor 102 (see FIG. 1), configured to authenticate an originator of the text-based content; access a voiceprint associated with the originator; convert at least a portion of the text-based content to an audio format in accordance with the voiceprint; and cause the audio format to be output to an audio output device of the portable device, such as speaker 118 (see FIG. 1) or another associated sound output device, such as a speaker paired to a portable electronic device through Bluetooth™, such as a Bluetooth™ car set, or a headset.

A number of methods can be used to provide the security or authentication controls at the server-side or the device-side. According to embodiments, authentication of at least one of the originator or the recipient can include verifying a digital signature of at least one of the originator or the recipient, or authenticating the originator in accordance with a digital certificate accompanying the text-based content. Authenticating at least one of the originator or the recipient can further include verifying that the recipient is a trusted recipient.

Server-side authentication permits a trusted third party, such as a wireless service provider or an enterprise to authenticate the originator and/or the recipient, and securely perform conversion of the text-based content to an audio format. For the purposes of illustration in the following example embodiments, the text-based content is an email message. The following examples assume that the originator of the text-based content has created a voiceprint, using HMM or other appropriate method, prior to creating or transmitting text-based content.

In a first embodiment, as shown in FIG. 4, the originator of the message is authenticated by a trusted server 400 using a certificate-based authentication. The voiceprint file (HMM VP) is uploaded by the originator (A) to the server 400 of a trusted third party with a digital certificate (Cert A) (402). This step can occur at any time prior to, or contemporaneously with, the creation or transmission of the text-based content, and the communication may be secured using known or later developed methods, such as Secure Sockets Layer (SSL). A digital certificate (also known as a public key certificate or identity certificate) generally refers to an electronic document which uses a digital signature to bind a public key with an identity—information such as the name of a person or an organization, their address, etc. The certificate can be used to verify that a public key belongs to an individual. A valid digital signature gives a recipient reason to believe that the message was created by a known sender, and that it was not altered in transit. While the present embodiment will be described using digital certificates, the authentication method can be easily adapted, using shared symmetric keys, or to use messages simply signed with a digital signature.

User A then sends a message to B, over any appropriate communication channel, and signs the message with the private key that corresponds to Cert A. An email client, such as provided by message application 138 (see FIG. 1), on a portable electronic device associated with B, receives the signed message (404). The email client then forwards the email message and signature to the trusted server 400 (406), for example, over a secure connection, such as an Secure Sockets Layer (SSL) or a Transport Layer Security (TLS) connection. The forwarding of the message and signature to the server 400 can be performed automatically by the email client on receipt of a signed message; can be user-initiated; can be based on specified conditions, such as time of day, presence status of user B; or can be based on user-specified preferences. In accordance with an embodiment, only a portion of a message is signed with A's digital signature, and only the signed portion is forwarded and converted to speech. This embodiment is particularly appropriate for large text messages, such as long email threads, where it is only desirable to convert the newly added portion of the thread into speech.

On receipt of the message, the server 400 verifies the signature (408), thereby verifying the identity of sender A. If the signature verifies correctly, the server 400 then verifies the status of the certificate to ensure it has not expired or been revoked (410). The server 400 then retrieves the voiceprint file (HMM VP) associated with the certificate (412), converts the email message to an audio format (414) and transfers the audio message back to B's device to play (416).

Alternately, as shown by the dotted path 407, the message can be automatically intercepted by a server prior to receipt by the email client. The intercepting server can be, for example, the enterprise server 270 (see FIG. 2), which may also be the trusted server. Alternately, the intercepting server may forward the intercepted message to the trusted server. The conditions for such interception can also be based on specified conditions, such as time of day, presence status of user B; or can be based on user-specified preferences. The originator A is authenticated at the trusted server, as described above, and the trusted server then sends the audio message directly to the device, or back to the enterprise server which then pushes the result to the device. This embodiment avoids having the email client of the device have to send the message, which may be quite large if attachments are included, to the trusted server.

Figure 5:
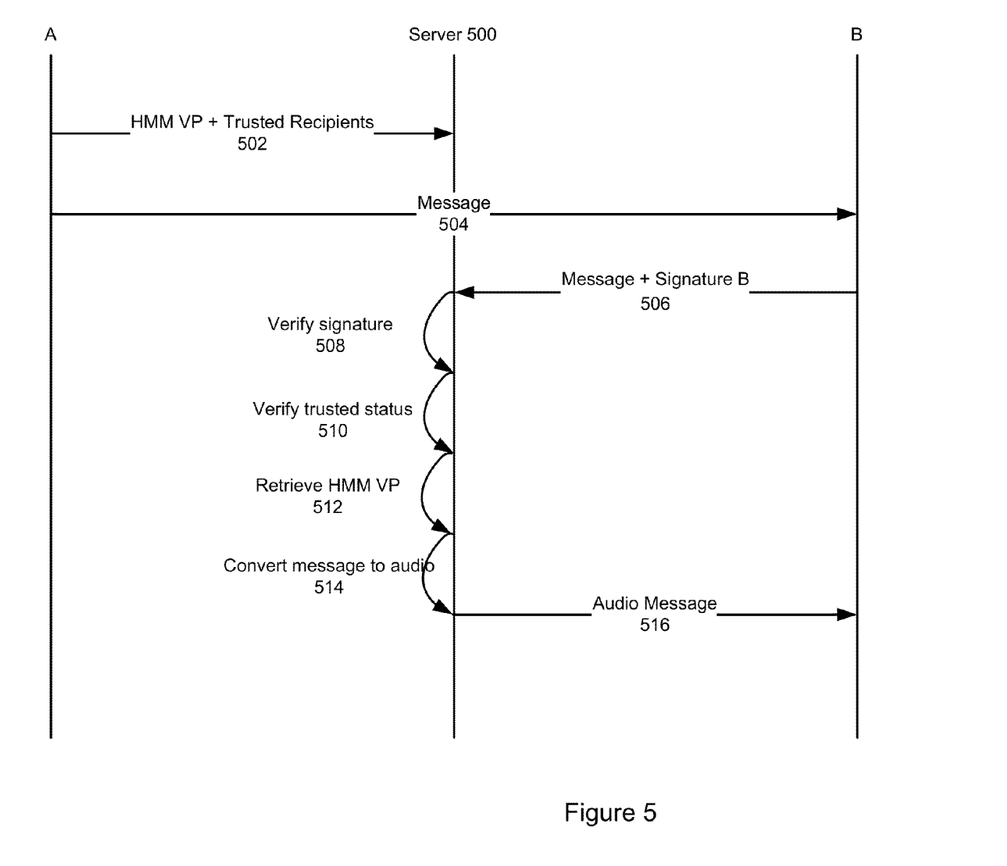
FIG. 5 is diagram of an example method of server-side authentication in accordance with the disclosure.

In the embodiment shown in FIG. 5, the recipient of the message is authenticated by a trusted server 500 and compared to a list of trusted recipients provided by sender A. In this way, A can grant permissions to certain trusted parties to be able to play messages using his voiceprint. In this embodiment, A's voiceprint file (HMM VP) is transmitted, over a secure connection, to a server 500, with a list of trusted recipients (502). When A causes a text message to be sent to B (504), the email client at B signs the message with B's signature, and forwards the signed email message to the trusted server 500 (506), as described above. On receipt of the message, the server 500 verifies B's signature (508), thereby verifying the identity of the recipient B. If B's signature verifies correctly, the server 500 then verifies that B is included in the list of trusted recipients previously provided by A (510). If B is on the list of trusted recipients, server 500 retrieves A's voiceprint file (HMM VP) (512), converts the email message to an audio format (514) and transfers the audio message back to B's device (516).

A further embodiment (not shown), authenticates both A and B by combining the authentication methods shown in FIGS. 4 and 5. In other words, the server verifies the identity of B as well as verifying that the content is from A. Sender A's voiceprint, digital certificate and a list of trusted recipients are transmitted to the server. A causes a digitally signed message to be sent to B, the signed message is, in turn, signed by the email client of B and forwarded to the server. The server then authenticates B based on B's signature and the list of trusted recipients, and authenticates A based on A's signature and the status of A's certificate. If both A and B are authenticated, A's voiceprint is retrieved, and the message converted as set out above.

Figure 6:
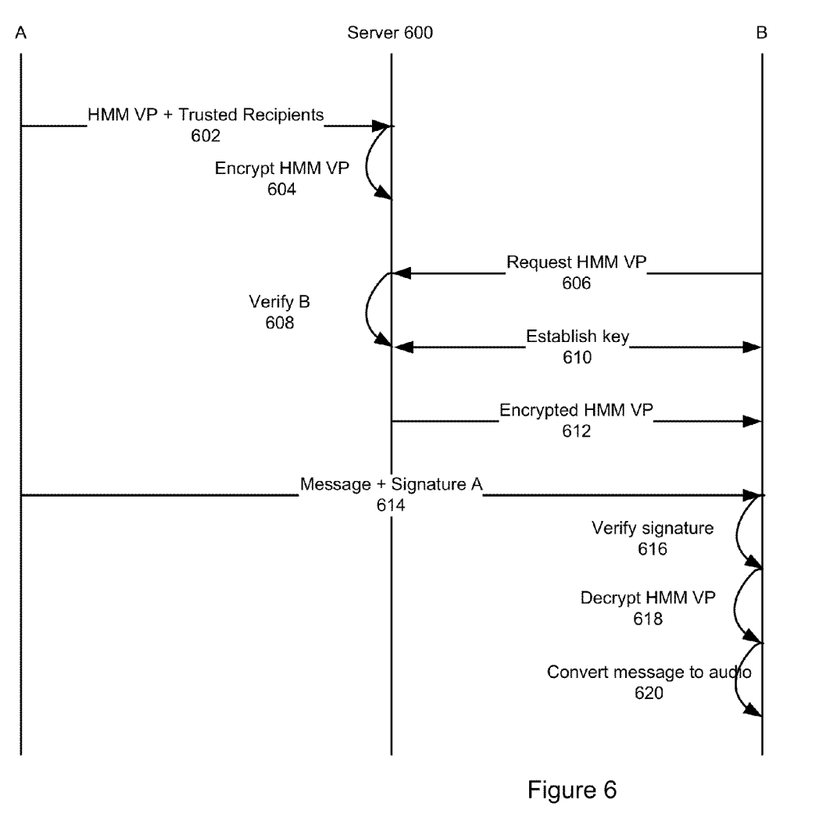
FIG. 6 is diagram of an example method of device-side authentication in accordance with the disclosure.

According to further embodiments, device-side authentication can be implemented using digital rights management (DRM) techniques. In an example device-side solution, the voiceprint file is stored in an encrypted format, and only decrypted if the identity of A and/or B is verified. Referring to FIG. 6, originator uploads the voiceprint file (HMM VP) to a server 600, with a list of trusted recipients, or other permissions (602). The server encrypts the file (604). The email client of the device associated with B then requests the encrypted voiceprint file for A from a server 600, such as a Lightweight Directory Access Protocol (LDAP) server (606). If A has set permissions as to who can retrieve the voiceprint file, the server 600 can verify the identity of B (608). The server and B's device then establish a key to use to encrypt the content (610), using, for example, the Simple Password Exponential Key Exchange (SPEKE), or Public Key Infrastructure (PKI) techniques. The encrypted file is transmitted to B (612). When the file is received by B, it can either be directly stored encrypted or re-encrypted with a different key which is stored in a protected manner within the hardware of the device. In accordance with various embodiments, the encrypted voice print file/decryption key is only accessible to the email client, which can be enforced using, for example, code signing on the email client application. When the email client of B receives a digitally signed email message (614) from A (for which it has a stored voiceprint file), the email client verifies the email signature (616), temporarily decrypts the voiceprint file (618), and convert the email to audio format (620).

The encrypted voiceprint file can optionally have an attached digital certificate to permit B to verify that the source of the signed message is A, as described above in relation to FIG. 4. Any suitable techniques, such as those supported by S/MIME (Secure/Multipurpose Internet Mail Extensions), can be used in the exchange of certificates. The certificate permits the verification of trust status, revocation status and expiry on the message, and only if all conditions are valid is the voiceprint file temporarily decrypted. For example, using a certificate permits A to revoke the certificate at any time, thereby easily disallowing future text-to-speech conversions. Other methods are also contemplated to permit the originator to set more fine grained control over the use of the voiceprint file. For example, the trusted server and recipient devices could store and enforce rules permitting conversion of only a limited number of words of a message, or limit conversion to a particular time date or time range.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of secure text-to-speech conversion, the method comprising, at a computing device:
   receiving, from an originator, a voiceprint and a list of trusted recipients;
   receiving, from a recipient, text-based content, provided to the recipient by the originator, and a digital signature of the recipient;
   in accordance with the digital signature of the recipient, verifying that the recipient is listed in the list of trusted recipients; and
   when the recipient is listed in the list of trusted recipients, converting, in accordance with the voiceprint, at least a portion of the text-based content to an audio format to obtain converted text-based content, for output to the recipient.

2. The method of claim 1, wherein verifying that the recipient is listed in the list of trusted recipients is preceded by verifying the digital signature of the recipient.

3. The method of claim 1, further comprising transferring the converted text-based content to the recipient.

4. The method of claim 1 further comprising:
   receiving, from the originator, a digital certificate of the originator; and
   receiving, from the recipient, a signature of the originator, provided to the recipient by the originator, with the text-based content.

5. The method of claim 4, further comprising verifying the signature of the originator against the digital certificate of the originator.

6. The method of claim 5 further comprising, when the signature of the originator compares with the digital certificate of the signature, verifying the status of the digital certificate.

7. The method of claim 6, wherein converting, in accordance with the voiceprint, at least a portion of the text-based content to an audio format to obtain converted text-based content, for output to the recipient, is performed when the status of the digital certificate is valid.

8. The method of claim 1, wherein the voiceprint permits synthesis of the originator's speech.

9. The method of claim 8, wherein the voiceprint uses hidden Markov models of the originator's voice characteristics.

10. A server for providing secure text-to-speech conversion, the server comprising:
a hardware processor capable of:
receiving, from an originator, a voiceprint and a list of trusted recipients;
receiving, from a recipient, text-based content, provided to the recipient by the originator, and a digital signature of the recipient;
in accordance with the digital signature of the recipient, verifying that the recipient is listed in the list of trusted recipients; and
when the recipient is listed in the list of trusted recipients, converting, in accordance with the voiceprint, at least a portion of the text-based content to an audio format to obtain converted text-based content, for output to the recipient.

11. The server of claim 10, wherein verifying that the recipient is listed in the list of trusted recipients is preceded by verifying the digital signature of the recipient.

12. The server of claim 10, wherein the hardware processor is capable of transferring the converted text-based content to the recipient.

13. The server of claim 10, wherein the hardware processor is further capable of:
receiving, from the originator, a digital certificate of the originator; and
receiving, from the recipient, a signature of the originator, provided to the recipient by the originator, with the text-based content.

14. The server of claim 13, wherein the hardware processor is further capable of verifying the signature of the originator against the digital certificate of the originator.

15. The server of claim 14, wherein the hardware processor is further capable of, when the signature of the originator compares with the digital certificate of the signature, verifying the status of the digital certificate.

16. The server of claim 15 wherein, when the status of the digital certificate is valid, the hardware processor is capable of converting, in accordance with the voiceprint, at least a portion of the text-based content to an audio format to obtain converted text-based content, for output to the recipient.

17. The server of claim 10, wherein the voiceprint permits synthesis of the originator's speech.

18. The server of claim 10, wherein the voiceprint uses hidden Markov models of the originator's voice characteristics.

19. A portable electronic device capable of providing secure text-to-speech conversion, the device comprising:
a hardware processor capable of:
obtaining an encrypted voiceprint, the encrypted voiceprint being associated to an originator;
obtaining text-based content from the originator;
authenticating the originator;
when the originator has been authenticated, decrypting the encrypted voiceprint to obtain a decrypted voiceprint;
converting at least a portion of the text-based content to an audio format in accordance with the decrypted voiceprint; and
causing the audio format to be output to a sound output device.

20. The device of claim 19, wherein authenticating includes verifying a digital signature of the originator.

21. The device of claim 19, wherein authenticating includes authenticating in accordance with a digital certificate accompanying the text-based content.

22. The device of claim 19, further comprising a memory capable of storing the encrypted voiceprint as an encrypted file.

23. The device of claim 22, wherein, to access the decrypted voiceprint, the hardware processor is capable of retrieving the encrypted file and a shared key, and of decrypting the encrypted file with the shared key.

24. The device of claim 19, wherein the decrypted voiceprint permits synthesis of the originator's voice.

25. The device of claim 19, wherein the decrypted voiceprint uses hidden Markov models of the originator's voice characteristics.

26. A non-transitory computer-readable medium having recorded thereon instructions to be carried out by a computing device to:
receive, from an originator, a voiceprint and a list of trusted recipients;
receive, from a recipient, text-based content, provided to the recipient by the originator, and a digital signature of the recipient;
in accordance with the digital signature of the recipient, verify that the recipient is listed in the list of trusted recipients; and
when the recipient is listed in the list of trusted recipients, convert, in accordance with the voiceprint, at least a portion of the text-based content to an audio format to obtain converted text-based content, for output to the recipient.

27. The non-transitory computer-readable medium of claim 26 wherein the instructions comprise additional instructions to be carried out by the computing device to verify the digital signature of the recipient prior to verifying that the recipient is listed in the list of trusted recipients.

28. The non-transitory computer-readable medium of claim 26 wherein the instructions comprise additional instructions to be carried out by the computing device to transfer the converted text-based content to the recipient.

29. The non-transitory computer-readable medium of claim 26 wherein the instructions comprise additional instructions to be carried out by the computing device to:
receive, from the originator, a digital certificate of the originator; and
receive, from the recipient, a signature of the originator, provided to the recipient by the originator, with the text-based content.

30. The non-transitory computer-readable medium of claim 29 wherein the instructions comprise further instructions to be carried out by the computing device to verify the signature of the originator against the digital certificate of the originator.

31. The non-transitory computer-readable medium of claim 30 wherein the instructions comprise supplemental instructions to be carried out by the computing device to, when the signature of the originator compares with the digital certificate of the signature, verify the status of the digital certificate.

32. The non-transitory computer-readable medium of claim 26 wherein the voiceprint permits synthesis of the originator's speech.

33. The non-transitory computer-readable medium of claim 32 wherein the voiceprint uses hidden Markov models of the originator's voice characteristics.

* * * * *